United States Patent
Saito et al.

(10) Patent No.: US 10,656,327 B2
(45) Date of Patent: May 19, 2020

(54) OPTICAL FIBER

(71) Applicant: FUJIKURA LTD., Tokyo (JP)

(72) Inventors: Shota Saito, Chiba (JP); Katsuhiro Takenaga, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/076,610

(22) PCT Filed: Dec. 5, 2016

(86) PCT No.: PCT/JP2016/086010
§ 371 (c)(1),
(2) Date: Aug. 8, 2018

(87) PCT Pub. No.: WO2017/168843
PCT Pub. Date: Oct. 5, 2017

(65) Prior Publication Data
US 2019/0049658 A1 Feb. 14, 2019

(30) Foreign Application Priority Data
Mar. 30, 2016 (JP) .................. 2016-067847

(51) Int. Cl.
G02B 6/02 (2006.01)
G02B 6/028 (2006.01)
G02B 6/036 (2006.01)

(52) U.S. Cl.
CPC ....... *G02B 6/02042* (2013.01); *G02B 6/0288* (2013.01); *G02B 6/03616* (2013.01)

(58) Field of Classification Search
None
See application file for complete search history.

(56) References Cited

U.S. PATENT DOCUMENTS

2006/0024008 A1  2/2006 Galvanauskas
2010/0008634 A1  1/2010 Guertin et al.
(Continued)

FOREIGN PATENT DOCUMENTS

CN  101052907 A  10/2007
CN  101809475 A   8/2010
(Continued)

OTHER PUBLICATIONS

N.K. Fontaine et al., "Experimental Investigation of Crosstalk Accumulation in a Ring-Core Fiber," 2013 IEEE Photonics Society Summer Topical Meeting Series, TuC4.2, pp. 111-112(2 pages).
(Continued)

*Primary Examiner* — Michelle R Connelly
(74) *Attorney, Agent, or Firm* — Osha Liang LLP

(57) ABSTRACT

An optical fiber that communicates in a predetermined communication band includes: a signal light propagation core that propagates light beams of up to (x+1)-th order LP mode, where x is an integer of two or more; and a coupler that propagates a light beam that is: coupled with a light beam of the (x+1)-th order LP mode propagating through the signal light propagation core, and suppressed from being coupled with light beams of up to the x-th order LP mode propagating through the signal light propagation core, wherein, mode coupling of the light beams of up to the x-th order LP mode propagating through the signal light propagation core is performed, and mode coupling between the light beam of the x-th order LP mode and the light beam of (x+1)-th order LP mode is suppressed.

12 Claims, 4 Drawing Sheets

(56) References Cited

U.S. PATENT DOCUMENTS

| | | | |
|---|---|---|---|
| 2010/0303402 A1 | 12/2010 | Ramachandran | |
| 2012/0251126 A1* | 10/2012 | Winzer .............. | G02B 6/03611 398/141 |
| 2014/0064686 A1* | 3/2014 | Lars .................... | G02B 6/0288 385/124 |
| 2014/0093205 A1 | 4/2014 | Gruner-Nielsen et al. | |

FOREIGN PATENT DOCUMENTS

| | | |
|---|---|---|
| CN | 102944910 A | 2/2013 |
| CN | 103649797 A | 3/2014 |
| EP | 1857844 A2 | 11/2007 |
| JP | 2008-506992 | 3/2008 |
| JP | 2014-52632 A | 3/2014 |
| JP | 2014-509411 A | 4/2014 |
| JP | 2014-513318 A | 5/2014 |

OTHER PUBLICATIONS

R. Ryf et al., "1705-km Transmission over Coupled-Core Fibre Supporting 6 Spatial Modes," ECOC 2014; Cannes, France, PD.3.2 (3 pages).

T. Fujisawa and K. Saitoh, "A Principal Mode Analysis of Strongly-Coupled 3-Core Fibres," ECOC 2015 (3 pages).

\* cited by examiner

OPTICAL FIBER

TECHNICAL FIELD

The present invention relates to an optical fiber, and is suitable for improving the degree of freedom of design.

BACKGROUND ART

An optical fiber used in an optical fiber communication system that is widely used currently has a structure in which the outer periphery of one core is surrounded by a clad, and an optical signal propagates through the core, whereby information is transmitted. In recent years, with the spread of optical fiber communication systems, the amount of information to be transmitted has increased dramatically. Along with such increase in the amount of information to be transmitted, in an optical fiber communication system, a large number of optical fibers, i.e., tens to hundreds of fibers are used to perform a large amount of long-distance optical communication.

In such an optical fiber communication system, it is known that a multi-core optical fiber having a plurality of cores and one clad surrounding the outer periphery of the cores is used to transmit a plurality of signals by light beams each propagating through one of the cores. In addition, there are known a few-mode optical fiber and a few-mode multi-core optical fiber that are respectively an optical fiber having a single core and a multi-core optical fiber that allow light beams of a plurality of modes to propagate through each core to enable a large amount of communication by superimposing a piece of information on a light beam of each mode.

It is known that Differential Mode Delay (DMD) occurs when light beams of a plurality of modes propagate through a core as described above. In the case where light beams of a plurality of modes propagate through a core, a receiver that receives the light beams generally performs multiple-input and multiple-output (MIMO) processing. However, when the Differential Mode Delay is large, the MIMO Processing tends to be complicated.

Non Patent Literatures 1 to 3 listed below describe that when mode coupling occurs, the Differential Mode Delays are averaged to reduce the load of the MIMO processing.

[Non-Patent Literature 1] N. K. Fontaine et al., "Experimental investigation of crosstalk accumulation in a ring-core fiber," 2013 IEEE Photonics Society Summer Topical Meeting Series, TuC4.2, pp. 111-112(2013)

[Non-patent document 2] R. Ryf et al., "1705-km transmission over coupled-core fiber supporting 6 spatial modes," ECOC 2014, PD.3.2 (2014)

[Non-Patent Document 3] T. Fujisawa and K. Saitoh, "A principal mode analysis of strongly-coupled 3-core fibers," ECOC 2015, We.1.4.6 (2015)

In order to cause mode coupling, it is necessary to reduce the differences between the effective refractive indexes of light beams of a plurality of modes, that is, the effective refractive index differences. However, when the effective refractive index differences are small, there are the following concerns. That is, the difference between the effective refractive index of the light beam of the highest order LP mode and the refractive index of the clad becomes small, which may cause loss of the light beam of the highest order LP mode. Alternatively, light beams of the LP modes unnecessary for communication may propagate to cause noise, or mode coupling between the unnecessary light beams and a light beam necessary for communication may be caused to lose the light beam necessary for communication. In these cases, light beams that are mode coupled may not propagate appropriately.

Therefore, one or more embodiments of the present invention provide an optical fiber through which light beams of a plurality of LP modes can propagate while being mode coupled with each other.

SUMMARY

One or more embodiments of present invention provide an optical fiber that communicates using light beams of up to x-th order LP mode (x is an integer of two or more) in a predetermined communication band, the optical fiber including: a signal light propagation core that allows propagation of light beams of up to (x+1)-th order LP mode; and a coupled member allowing propagation of a light beam that is to be coupled with a light beam of the (x+1)-th order LP mode propagating through the signal light propagation core, and that is suppressed from being coupled with light beams of up to x-th order LP mode propagating through the signal light propagation core, wherein, the light beams of up to x-th order LP mode propagating through the signal light propagation core are mode coupled with each other, and mode coupling between the light beam of x-th order LP mode and the light beam of (x+1)-th order LP mode is suppressed.

Alternatively, one or more embodiments of the present invention provide an optical fiber that communicates using light beams of up to x-th order LP mode (x is an integer of two or more) in a predetermined communication band, the optical fiber including: a signal light propagation core that allows propagation of light beams of up to (x+2)-th order LP mode and higher; and a coupled member allowing propagation of a light beam that is to be coupled with a light beam of any of (x+1)-th order LP mode and higher propagating through the signal light propagation core, and that is suppressed from being coupled with light beams of up to x-th order LP mode propagating through the signal light propagation core, wherein, the light beams of up to x-th order LP mode propagating through the signal light propagation core are mode coupled with each other, mode coupling between the light beam of x-th order LP mode and the light beam of (x+1)-th order LP mode is suppressed, and the light beams of the (x+1)-th order LP mode and higher propagating through the signal light propagation core are mode coupled with each other.

All of the above-described one or more embodiments of optical fibers allow propagation of a light beam of an LP mode that is higher than LP modes used for communication. Thus, the optical fibers can confine light beams of LP modes used for communication firmly in the signal light propagation core. In addition, since light beams of the LP modes that are not used for communication are coupled with a light beam propagating through the coupled member, it is possible to suppress the influence of the light beams of the LP modes that are not used for communication on light beams of the LP modes used for communication. Therefore, according to one or more embodiments of the optical fiber of the present invention, it is possible to allow appropriate propagation of light beams of a plurality of LP modes while the light beams are mode coupled with each other.

In addition, the signal light propagation core may include: an inner core including a center axis; and an outer core surrounding an outer circumferential surface of the inner core and having a refractive index higher than that of the inner core.

Since the core having a refractive index profile of a ring type is used as described above, the light beams up to a predetermined LP mode can be easily mode coupled, and the effective refractive index of a light beam of the predetermined LP mode and the effective refractive index of a light beam of the LP mode next to the predetermined LP mode can be separated. For example, when the x-order LP mode is the third LP mode, mode coupling of the light beam of the $LP_{01}$ mode, the light beam of the $LP_{11}$ mode, and the light beam of the $LP_{21}$ mode with each other can be easily caused by making their effective refractive indexes close to each other, and mode coupling of the light beam of the $LP_{02}$ mode and light beams of up to the third LP mode can be suppressed from being mode coupled by separating the effective refractive index of the light beam of the $LP_{21}$ mode and the effective refractive index of the $LP_{02}$ mode, which is the fourth LP mode. It should be noted the third order LP mode may be the $LP_{02}$ mode and the fourth order LP mode may be the $LP_{21}$ mode, or another combination of LP modes may be conceived.

The coupled member may lose more of a light beam propagating therethrough than the signal light propagation core.

By configuring an optical fiber as described above, it is possible to attenuate light beams of (x+1)-th order LP mode and higher that has moved to the coupled member by being coupled with the light beam propagating through the coupled member.

The coupled member may be a clad that surrounds the outer circumferential surface of the signal light propagation core.

In this case, the light beams of (x+1)-th order LP mode and higher are coupled with the light beam of the clad mode propagating through the clad. Generally, a clad is an essential component for an optical fiber for communication. By using the clad, which is an essential component, as a coupled member, it is not necessary to separately provide a coupled member. Therefore, it is possible to suppress complication of the structure of an optical fiber. In addition, since the clad is used as the coupled member, the light beams of (x+1)-th order LP mode and higher are light beams of clad modes, and thus the ratio of light beams that returns to the signal light propagation core to the light beams of (x+1)-th order LP mode and higher can be small. Further, when the outer circumferential surface of the clad is coated with a coating layer having a refractive index higher than that of the clad, a clad light beam is absorbed by the coating layer, thereby enabling lose of the light beam unnecessary for communication.

When the coupled member is a clad that surrounds the outer circumferential surface of the signal light propagation core, all relationships:

$\Delta n_{eff}a < \Delta n_{eff}c$; and $\Delta n_{eff}b < \Delta n_{eff}c$ may be satisfied where $\Delta n_{eff}a$ is defined as a maximum value among effective refractive index differences between light beams of LP modes having effective refractive indexes that are adjacent to each other except for the x-th order LP mode and the (x+1)-th order LP mode, $\Delta n_{eff}b$ is defined as a difference between an effective refractive index of a light beam of the highest order LP mode propagating through the signal light propagation core and a refractive index of the clad, and $\Delta n_{eff}c$ is defined as a difference between an effective refractive index of the light beam of x-th order LP mode and an effective refractive index of the light beam of (x+1)-th order LP mode.

In addition, the relationship:

$\Delta n_{eff}b < \Delta n_{eff}a$ may be satisfied.

Further, the side core that is parallel to the signal light propagation core may serve as the coupled member.

By using the side core as the coupled member, it is possible to extract the light beams of (x+1)-th order LP mode and higher that have been moved to the side core can be extracted from the side core. In addition, since the light beams of (x+1)-th order LP mode and higher propagating through the signal light propagation core do not have to be coupled with the light beam of the clad mode, the degree of freedom in designing the signal light propagation core can be improved.

When the side core that is parallel to the signal light propagation core serves as the coupled member, all relationships:

$\Delta n_{eff}a < \Delta n_{eff}c$;

$\Delta n_{eff}a < \Delta n_{eff}d$;

$\Delta n_{eff}b < \Delta n_{eff}c$; and $\Delta n_{eff}b < \Delta n_{eff}d$ may be satisfied where $\Delta n_{eff}a$ is defined as a maximum value among effective refractive index differences between light beams of LP modes having effective refractive indexes that are adjacent to each other except for the x-th order LP mode and the (x+1)-th order LP mode, $\Delta n_{eff}b$ is defined as a minimum value among differences between the effective refractive indexes of the light beams of (x+1)-th order LP mode and higher propagating through the signal light propagation core and an effective refractive index of a light beam of at least one mode propagating through the side core, $\Delta n_{eff}c$ is defined as a difference between an effective refractive index of the light beam of x-th order LP mode and an effective refractive index of the light beam of (x+1)-th order LP mode, and $\Delta n_{eff}d$ is defined as a minimum value among differences between the effective refractive index of the light beam of x-th order LP mode and the effective refractive indexes of the light beams of the modes propagating through the side core.

In addition, the relationship:

$\Delta n_{eff}b < \Delta n_{eff}a$ may be satisfied.

In this case, the side core may be a single mode core.

In this case, the light beams of the (x+1)-th order LP mode and higher propagating through the signal light propagation core cause crosstalk as a light beam of the $LP_{01}$ mode of the side core and move to the side core.

In addition, the optical fiber may include a plurality of the signal light propagation cores.

In this case, since through each signal light propagation core, a light beam to be mode coupled propagates, it is possible to realize an optical fiber capable of transmitting a higher amount of information.

As described above, according to one or more embodiments of the present invention, it is possible to provide an optical fiber that allows appropriate propagation of light beams of a plurality of LP modes while the light beams are mode coupled with each other.

DESCRIPTION

Figure 1:
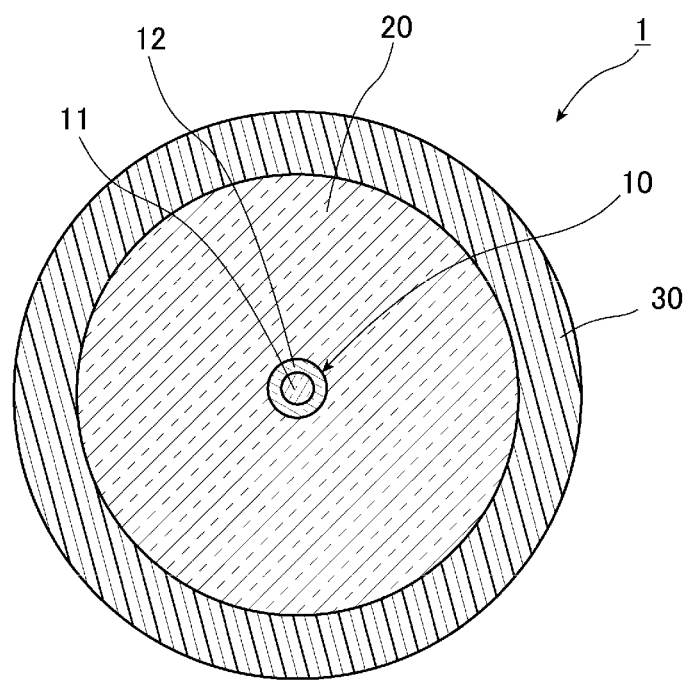
FIG. 1 is a sectional view perpendicular to the longitudinal direction of an optical fiber according to one or more embodiments.

Hereinafter, embodiments of an optical fiber according to the present invention will be described in detail with reference to the drawings. In order to facilitate understanding, the scales in the drawings may be different from the scales described in the following description.

FIG. 1 is a sectional view that is perpendicular to the longitudinal direction of an optical fiber according to one or more embodiments. As illustrated in FIG. 1, an optical fiber 1 includes a core 10 through which signal light propagates, a clad 20 that surrounds the outer circumferential surface of the core 10 with no gap, and a coating layer 30 that coats the outer circumferential surface of the clad 20. The core 10 includes an inner core 11 including the center axis of the core 10, and an outer core 12 surrounding the outer circumferential surface of the inner core 11 with no gap. The core 10 is a signal light propagation core through which signal light propagates.

Figure 2:
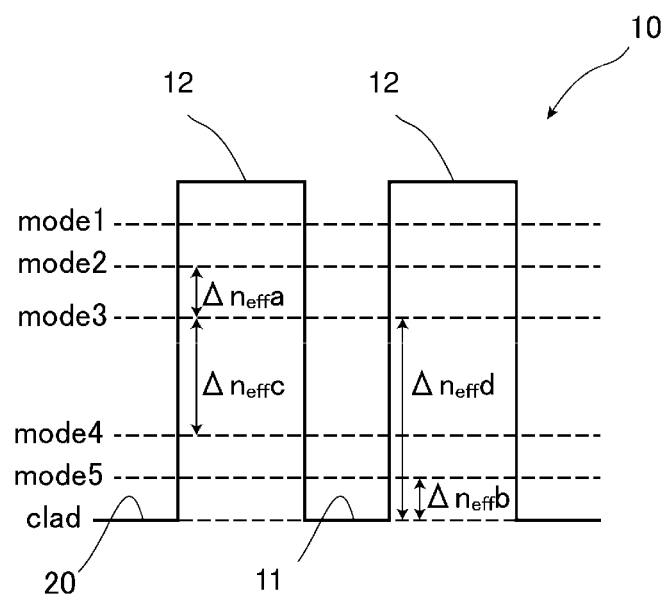
FIG. 2 is a diagram illustrating an example of a refractive index profile and effective refractive indexes of the optical fiber of FIG. 1.

FIG. 2 is a diagram illustrating an example of a refractive index profile and effective refractive indexes of the optical fiber 1 of FIG. 1. As illustrated in FIG. 2, the outer core 12 has a refractive index higher than the refractive index of the inner core 11 and the refractive index of the clad 20, and has a refractive index profile of a ring type. In one or more embodiments, the inner core 11 is made to have a refractive index that is substantially identical to that of the clad 20. Further, in FIG. 2, the effective refractive indexes of light beams of LP modes propagating through the cores 10 and the refractive index of the clad are indicated by broken lines.

The optical fiber 1 is an optical fiber that communicates using light beams of up to x-th order LP mode (x is an integer of two or more) in a predetermined communication band. However, in this communication band, the core 10 allows propagation of light beams of (x+1)-th order LP mode and higher. FIG. 2 illustrates an example where x is three, and light beams of five LP modes propagate. In FIG. 2, the five LP modes are indicated as mode 1 to mode 5. Mode 1 is indicated as $LP_{01}$ mode, mode 2 is indicated as $LP_{11}$ mode, mode 3 is indicated as $LP_{21}$ mode, mode 4 is indicated as $LP_{02}$ mode, and mode 5 is indicated as $LP_{31}$ mode. However, the mode 3 may be indicated as $LP_{02}$ mode, and the mode 4 may be indicated as $LP_{21}$ mode. As described above, through the optical fiber 1 of the example illustrated in FIG. 2, the light beams of five LP modes propagate in the communication band. However, since x is set to three as described above, the optical fiber 1 communicates using only the light beams of three LP modes: mode 1 to mode 3, and the light beams of mode 4 and mode 5 propagating through the optical fiber 1 are regarded as unnecessary light beams that are not used for communication. In the present specification, when a light beam of x-th order LP mode is referred, LP modes are referred as the first order LP mode (mode 1), the second order LP mode (mode 2), and the third order LP mode (mode 3), in the descending order of the effective refractive index.

In addition, the optical fiber 1 is configured such that light beams of up to x-th order LP mode used for communication are mode coupled. In the example of FIG. 2, the optical fiber 1 is configured such that the light beam of mode 1, the light beam of mode 2, and the light beam of mode 3 are mode coupled with each other. That is, the effective refractive index of the light beam of mode 1 and the effective refractive index of the light beam of mode 2 are set to have a difference small enough to cause mode coupling, and the effective refractive index of the light beam of mode 2 and the effective refractive index of the light beam of mode 3 are set to have a difference small enough to cause mode coupling.

Further, the optical fiber 1 is configured such that the light beams of (x+1)-th order LP mode and higher propagating through the core 10 are mode coupled separately from the light beams of up to x-th order LP mode. In the example of FIG. 2, the effective refractive index of the light beam of mode 4 and the effective refractive index of the light beam of mode 5 are set to have a difference small enough to cause mode coupling of the light beam of mode 4 and the light beam of mode 5. Here, $\Delta n_{eff}a$ is defined as the maximum value among the effective refractive index differences between light beams of LP modes having effective refractive indexes that are adjacent to each other except for x-th order LP mode and (x+1)-th order LP mode. In the example of FIG. 2, the maximum effective refractive index difference among the effective refractive index difference between the light beams of mode 1 and mode 2, the effective refractive index difference between the light beams of mode 2 and mode 3, and the effective refractive index difference between the light beams of mode 4 and of mode 5 is $\Delta n_{eff}a$. The value $\Delta n_{eff}a$ is set small enough to cause mode coupling (for example, $1.0 \times 10^{-3}$ or less, $2.0 \times 10^{-3}$ or less, etc.).

As described above, the light beams of (x+1)-th order LP mode and higher cause mode coupling separately from the light beams of up to x-th order LP mode. Thus, mode coupling of the light beam of x-th order LP mode and the light beam of (x+1)-th order LP mode is suppressed. Here, $\Delta n_{eff}c$ is defined as the difference between the effective refractive index of the light beam of x-th order LP mode, which is the highest order LP mode used for communication, and the effective refractive index of the light beam of (x+1)-th order LP mode, which is the lowest order LP mode not used for communication. The relationship:

$$\Delta n_{eff}a < \Delta n_{eff}c$$

is then satisfied. The value $\Delta n_{eff}c$ is set large enough to suppress mode coupling between the light beam of x-th order LP mode and the light beam of (x+1)-th order LP mode. In the example of FIG. 2, the difference between the effective refractive index of the light beam of mode 3 and the effective refractive index of the light beam of mode 4 is $\Delta n_{eff}c$, and the mode coupling is suppressed between the light beam of mode 3 and the light beam of mode 4.

Further, any of the light beams of (x+1)-th order LP mode and higher propagating through the core 10 is coupled with the light beam of the clad mode propagating through the clad 20. A light beam that is most likely to be coupled with the light beam of the clad mode is the light beam of the highest order LP mode propagating through the core 10. Therefore, now $\Delta n_{eff}b$ is defined as the difference between the effective refractive index of the light beam of the highest order LP mode propagating through the core 10 and the refractive index of the clad 20. In the example of FIG. 2, the difference between the effective refractive index of the light beam of mode 5 and the refractive index of the clad is $\Delta n_{eff}b$. Thus, the value $\Delta n_{eff}b$ is made smaller than a predetermined value so that the light beam of mode 5 can be coupled with the light beam of the clad mode propagating through the clad 20. Specifically, the relationship:

$$\Delta n_{eff}b < \Delta n_{eff}c$$

is satisfied.

Further, the relationship:

$$\Delta n_{eff}b < \Delta n_{eff}a$$

may be satisfied.

Since the light beam of mode 1, the light beam of mode 2 and the light beam of mode 3 are mode coupled with each other as described above, if $\Delta n_{eff}b$ is smaller than $\Delta n_{eff}a$, the light beam of the highest order LP mode propagating through the core 10 (the light beam of mode 5) can be more appropriately coupled with the light beam of the clad mode propagating through the clad 20. However, when $\Delta n_{eff}a$ is sufficiently small, the light beam of mode 5 can be coupled with the light beam of the clad mode propagating through the clad 20. even when $\Delta n_{eff}b$ is larger than $\Delta n_{eff}a$. As described above, in one or more embodiments, the clad 20 is a member through which a light beam to be coupled with light beams of unnecessary LP modes, which are not used for communication, propagates. Thus, the clad 20 can be regarded as a coupled member (or coupler). In addition, the clad 20 is coated with the coating layer 30, and the light beam propagating through the clad 20 is absorbed by the coating layer 30. Therefore, the clad 20 causes lose of the light beam propagating therethrough than the core 10.

Incidentally, in one or more embodiments, $\Delta n_{eff}d$ is defined as the difference between the effective refractive index of the light beam of x-th order LP mode and the refractive index of the clad 20. The difference between the effective refractive index of the light beam of mode 3 and the refractive index of the clad 20 is $\Delta n_{eff}d$ in the example of FIG. 2. In this case, $\Delta n_{eff}d$ is larger than $\Delta n_{eff}c$, and coupling of the light beams of up to x-th order LP mode propagating through the core with the light beam of the clad mode is suppressed. Thus, in the example of FIG. 2, coupling of the light beams of mode 1 to mode 3 propagating through the core with the light beam of the clad mode is suppressed.

As described above, the optical fiber 1 of one or more embodiments is an optical fiber that communicates using the light beams of up to x-th order LP mode (x is an integer of two or more) in a predetermined communication band, and the core 10 allows propagation of the light beams of (x+1)-th order LP mode and higher. Therefore, the light beams of up to x-th order LP mode used for communication can be firmly confined in the core 10, the effective refractive index differences between the light beams of up to x-th order mode can be reduced, and the light beams up to x-th order LP mode can be easily mode coupled with each other. Further, the light beam of the clad mode propagating through the clad 20 as a coupled member is coupled with the light beam of the highest order LP mode propagating through the core 10, and the light beams of (x+1)-th order LP mode and higher propagating through the core 10 are mode coupled with each other separately from the light beams of up to x-th order LP mode. Thus, it is possible to release the light beams of (x+1)-th order LP mode and higher, which are not used for communication, to the clad 20 to attenuate the light beams. Therefore, it is possible to suppress the influence of light beams of the LP modes that are not used for communication on light beams of the LP modes used for communication. Thus, according to the optical fiber 1 of one or more embodiments, light beams of a plurality of modes used for communication are mode coupled with each other while propagating properly.

In the example illustrated in FIGS. 1 and 2, the light beam of mode 4 and the light beam of mode 5 are regarded as the light beams of (x+1)-th order LP mode and higher, and the light beams of (x+1)-th order LP mode and higher are mode coupled with each other. However, when a light beam of only one mode is included in light beams of (x+1)-th order LP mode and higher includes, there is no concept of mode coupling of light beams of (x+1)-th order LP mode and higher. For example, when mode 5 does not exist in FIG. 2, and the light beam of mode 4 is coupled with the light beam of the clad mode, the light beam of mode 4 need not be coupled with a light beam of another mode in the core 10.

In addition, in one or more embodiments, the core 10 has a refractive index profile of a ring type. Therefore, the light beams up to the predetermined LP mode can easily be coupled with each other, and the effective refractive index of a light beam of the predetermined LP mode and the effective refractive index of a light beam of the LP mode next to the predetermined LP mode can be separated. For example, as in the above-described embodiments, a design that enables easy mode coupling of the light beam of the $LP_{01}$ mode, the light beam of the $LP_{11}$ mode, and the light beam of the $LP_{21}$ mode with each other by making their effective refractive indexes close to each other, and enables suppression of mode coupling of the light beam of the $LP_{02}$ mode and the light beams of up to the third LP mode by separating the effective refractive index of the light beam of the $LP_{21}$ mode and the effective refractive index of the light beam of the $LP_{02}$ mode, which is the fourth LP mode can be easily made.

Next, additional embodiments of the present invention will be described in detail with reference to FIGS. 3 to 5. Here, components that are identical or similar to those in the previously-described embodiments are indicated by the same reference numerals and the description thereof will not be repeated unless otherwise particularly mentioned.

Figure 3:
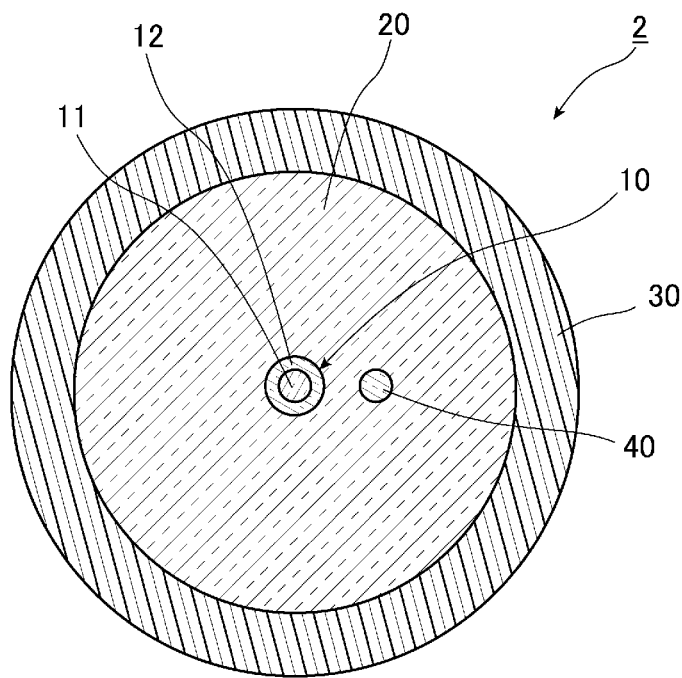
FIG. 3 is a sectional view perpendicular to the longitudinal direction of an optical fiber according to one or more embodiments.

FIG. 3 is a sectional view perpendicular to the longitudinal direction of the optical fiber according to one or more embodiments. As illustrated in FIG. 3, an optical fiber 2 is different from the optical fiber 1 of the previously-described embodiments in that the optical fiber 2 includes a side core 40 that is parallel to the core 10.

Figure 4:
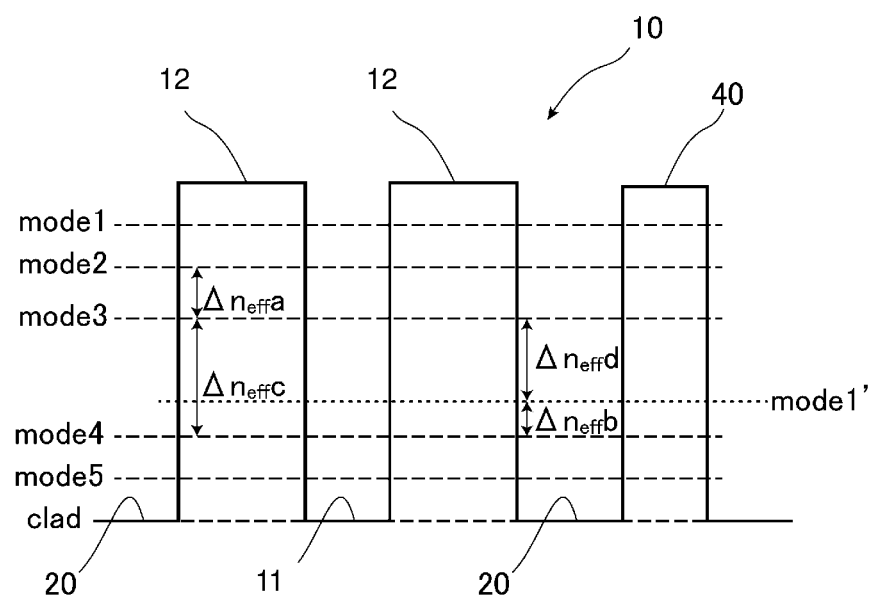
FIG. 4 is a diagram illustrating an example of a refractive index profile and effective refractive indexes of the optical fiber of FIG. 3.

FIG. 4 is a diagram illustrating an example of a refractive index profile and effective refractive indexes of the optical fiber 2 of FIG. 3. As illustrated in FIG. 4, the refractive index of the side core 40 is higher than the refractive index of the clad 20. In one or more embodiments, the side core 40 is a single mode core in a predetermined communication band of the optical fiber 2. In FIG. 4, similarly to FIG. 2, the effective refractive indexes of light beams of modes propagating through the core 10 and the refractive index of the clad 20 are indicated by broken lines, and the effective refractive index of a light beam propagating through the side core 40 is indicated by a dotted line. Since the side core 40 is a single mode core as described above, the mode of light beam propagating through the side core 40 is indicated as mode 1'.

In one or more embodiments, any of light beams of (x+1)-th order LP mode and higher propagating through the core 10 is coupled with a light beam propagating through the side core 40, and light beams of up to x-th order LP mode propagating through the core 10 are suppressed from coupling with the light beam propagating through the side core 40. In the example illustrated in FIG. 4, among the light beams of (x+1)-th order LP mode and higher, a light beam that is most likely to be coupled with the light beam propagating through the side core 40 is the light beam of mode 4, and the light beam of mode 3 is suppressed from being mode coupled with the light beam of mode 1' propagating through the side core 40.

Here, $\Delta n_{eff}a$ and $\Delta n_{eff}c$ are defined similarly to those in previously-described embodiments. In one or more embodiments, $\Delta n_{eff}b$ is defined as the minimum value among differences between the effective refractive indexes of the light beams of (x+1)-th order LP mode and higher propagating through the core 10 and the effective refractive index of the light beam of the mode propagating through the side core 40. In the example illustrated in FIG. 4, the difference between the effective refractive index of the light beam of mode 4 propagating through the core 10 and the effective refractive index of the light beam of mode 1' propagating through the side core 40 is $\Delta n_{eff}b$. Further, $\Delta n_{eff}d$ is defined as the minimum value among differences between the effective refractive index of the light beam of x-th order LP mode propagating through the core 10 and the effective refractive indexes of the light beams of the modes propagating through the side core 40. In the example illustrated in FIG. 4, the difference between the effective refractive index of the light beam of mode 3 and the effective refractive index of the light beam of mode 1' propagating through the side core 40 is $\Delta n_{eff}d$.

At this time, the light beam of (x+1)-th order LP mode propagating through the core 10 (the light beam of mode 4 in the example of FIG. 4) has to be coupled with the light beam propagating through the side core 40, and the light beam of x-th order LP mode (the light beam of mode 3 in the example of FIG. 4) has to be suppressed from being coupled with the light beam propagating through the side core 40. Thus, the relationship:

$\Delta n_{eff}b < \Delta n_{eff}d$ is satisfied.

In addition, as described above, the light beams of up to x-th order LP mode propagating through the core 10 have to be mode coupled with each other and the light beam of x-th order LP mode (the light beam of mode 3 in the example of FIG. 4) has to be suppressed from being coupled with the light beam propagating through the side core 40. Thus, the relationship:

$\Delta n_{eff}a < \Delta n_{eff}d$ is satisfied.

Similarly to the optical fiber 1 of previously-described embodiments, the relationship:

$\Delta n_{eff}a < \Delta n_{eff}c$ is satisfied.

In addition, as apparent from FIG. 4, the relationship:

$\Delta n_{eff}b < \Delta n_{eff}c$ is satisfied.

When the above conditions are satisfied, in the example of FIG. 4, the light beam of mode 4 can be coupled with the light beam propagating through the side core 40. In addition, since the light beams of (x+1)-th order LP mode and higher are mode coupled with each other separately from the light beams of up to x-th order LP mode, the light beam of mode 5 is coupled with the light beam of mode 4. Thus, the light beam of mode 5 can be coupled with the light beam propagating through the side core 40. As described above, in one or more embodiments, the side core 40 is a member through which a light beam to be coupled with unnecessary light beams, which are of LP modes not used for communication, propagates. Thus, the side core 40 can be regarded as a coupled member.

The side core 40 may lose light beams propagating therethrough than the core 10. There are some ways to make the side core 40 lose light beams as described above, and one of them is to distribute a hydroxyl group in a glass rod to be used as the side core 40 and make excessive oxygen to flow therethrough at the time of dehydration.

Next, another example of the effective refractive indexes of the optical fiber 2 will be described. FIG. 5 is a diagram illustrating another example of the refractive index profile and the effective refractive indexes of the optical fiber 2 of FIG. 3. As illustrated in FIG. 5, this example is different from the example illustrated in FIG. 4 in a point that the effective refractive index of the light beam of mode 1' propagating through the side core 40 is between the effective refractive index of the mode 4 propagating through the core 10 and the effective refractive index of the light beam of mode 5. In this example, the effective refractive index of the light beam of mode 1' propagating through the side core 40 is made closer to the effective refractive index of the light beam of mode 4 than to the effective refractive index of the light beam of mode 5 propagating through the core 10. Even when the effective refractive index of the light beam of mode 1' propagating through the side core 40 is not between the effective refractive index of the light beam of x-th order mode propagating through the core 10 and the effective refractive index of the light beam of the (x+1)-th order mode, the light beam of mode 4 can be coupled with the light beam propagating through the side core 40, and the light beam of mode 5 can then be coupled with the light beam propagating through the side core 40 by being coupled with the light beam of mode 4 when the expressions presented in the example of FIG. 4 are satisfied.

Although not illustrated in particular, when the effective refractive index of the light beam of mode 1' propagating through the side core 40 is smaller than the effective refractive index of the light beam of mode 5, that is, the effective refractive index of the light beam of mode 1' is between the effective refractive index of the light beam of mode 5 and the refractive index of the clad 20, the same conditions as in previously-described embodiments can be applied by defining $\Delta n_{eff}b$ as the difference between the effective refractive index of the light beam of mode 5 and the effective refractive index of the light beam of mode 1' propagating through the side core 40.

As described above, according to the optical fiber 2 of one or more embodiments, the side core 40 serves as a coupled member. Thus, it is possible to extract the light beam of (x+1)-th order LP mode and higher that have been moved to the side core 40 can be extracted from the side core 40. In addition, since the light beams of (x+1)-th order LP mode and higher propagating through the core 10 do not have to be coupled with the light beam of the clad mode propagating through the clad 20, the degree of freedom in designing the core 10 can be improved.

Figure 5:
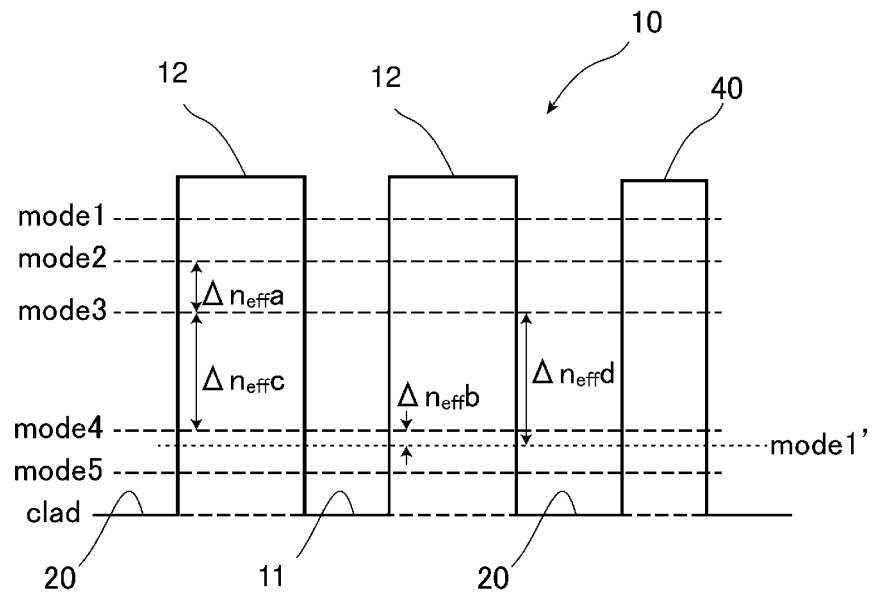
FIG. 5 is a diagram illustrating another example of a refractive index profile and effective refractive indexes of the optical fiber of FIG. 3.

Also in one or more embodiments, in the examples illustrated in FIGS. 3 to 5, the light beam of mode 4 and the light beam of mode 5 are the light beams of (x+1)-th order LP mode and higher, and the light beams of (x+1)-th order LP mode and higher are mode coupled with each other. However, when a light beam of only one mode is included in light beams of (x+1)-th order LP mode and higher, there is no concept of mode coupling of light beams of (x+1)-th order LP mode and higher. For example, when mode 5 does not exist in FIGS. 4 and 5, the light beam of mode 4 need not be coupled with a light beam of another mode in the core 10.

Next, additional embodiments of the invention will be described in detail referring to FIG. 6. Here, components that are identical or similar to those in the previously-described embodiments are indicated by the same reference numerals and the description thereof will not be repeated unless otherwise particularly mentioned.

Figure 6:
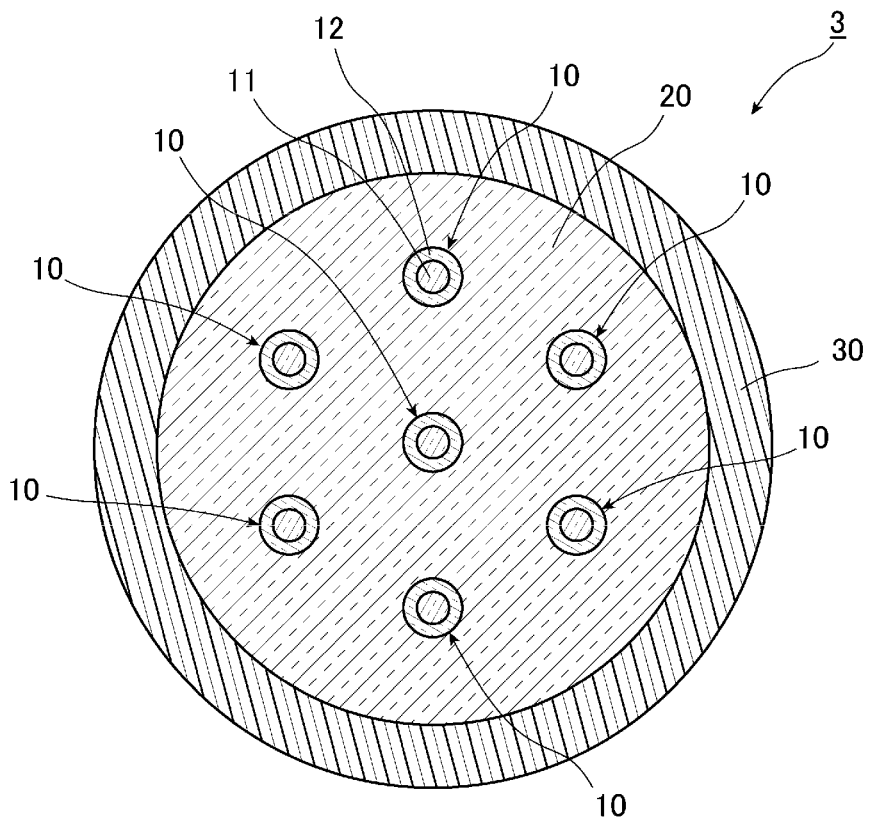
FIG. 6 is a sectional view perpendicular to the longitudinal direction of an optical fiber according to one or more embodiments.

FIG. 6 is a sectional view perpendicular to the longitudinal direction of the optical fiber according to one or more embodiments. As illustrated in FIG. 6, an optical fiber 3 of one or more embodiments is a multi-core optical fiber including a plurality of cores 10, which are described in the previously-described embodiments, and a clad 20 that is similar to the clad 20 of the previously-described embodiments. Therefore, the light beams of (x+1)-th order LP mode and higher propagating through the cores 10 are coupled with a light beam of the clad mode propagating through the clad 20.

According to the optical fiber 3 of one or more embodiments, each of the cores 10 allows propagation of a light beam to be mode coupled. Thus, it is possible to realize an optical fiber capable of transmitting a higher amount of information.

Next, additional embodiments of the invention will be described in detail referring to FIG. 7. Here, components that are identical or similar to those in the previously-described embodiments are indicated by the same reference numerals and the description thereof will not be repeated unless otherwise particularly mentioned.

Figure 7:
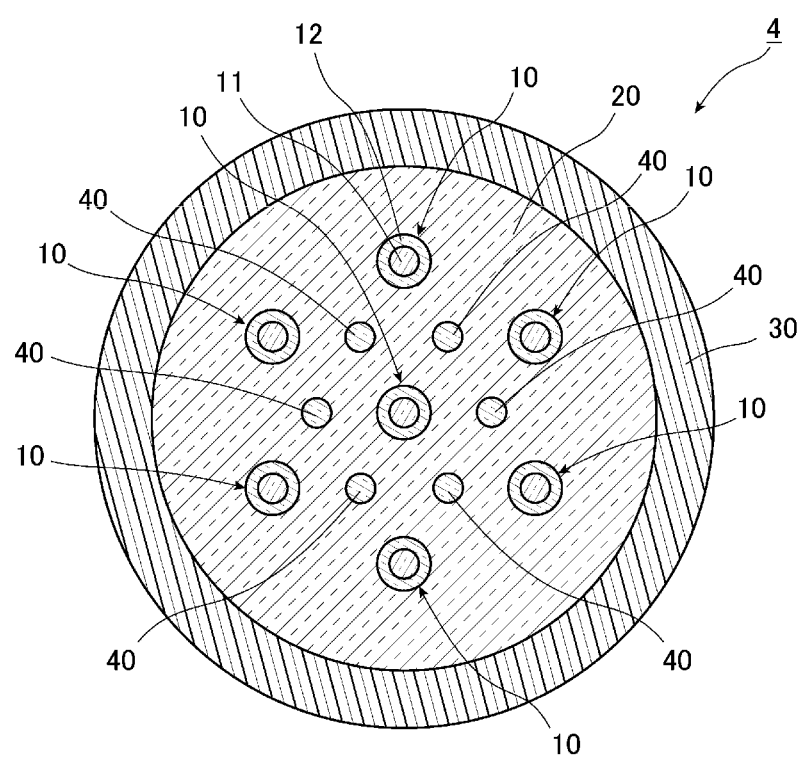
FIG. 7 is a sectional view perpendicular to the longitudinal direction of an optical fiber according to one or more embodiments.

FIG. 7 is a sectional view perpendicular to the longitudinal direction of the optical fiber according to one or more embodiments. As illustrated in FIG. 7, an optical fiber 4 of one or more embodiments is a multi-core optical fiber including a plurality of cores 10 and a plurality of side cores 40, which are described in the previously-described embodiments, and a clad 20 that is similar to the clad 20 of the previously-described embodiments.

According to the optical fiber 4 of one or more embodiments, each of the cores 10 allows propagation of a light beam to be mode coupled. Thus, it is possible to realize an optical fiber capable of transmitting a higher amount of information. The number of the side cores 40 may be the same as or different from the number of the cores 10. For example, in the example illustrated in FIG. 7, each of the side cores 40 is arranged adjacently to three of the cores 10 and can be coupled with light beams of (x+1)-th order LP mode and higher propagating through each of the cores 10 that are adjacent thereto.

(Design Examples of Optical Fiber)

Next, design examples of the optical fiber of the above-described embodiments will be described.

An optical fiber having the refractive index profile of FIG. 1 was designed. In this optical fiber, the radius r1 of the inner core 11 was set to 4.5 μm, the radius of the outer periphery of the outer core 12 was set to 13.0 μm, the refractive index of the inner core 11 was set equal to the refractive index of the clad 20, and the relative refractive index difference A of the outer core 12 to the clad 20 was set to 0.34%. This optical fiber was used as an optical fiber for communication at a wavelength of 1550 nm.

The LP modes of the light beams propagating through the core 10 at this wavelength were $LP_{01}$ mode, $LP_{11}$ mode, $LP_{21}$ mode, $LP_{31}$ mode, $LP_{02}$ mode, and $LP_{12}$ mode. The effective refractive indexes $n_{eff}$ of the light beams of the modes were as presented in Table 1. Accordingly, the effective refractive index differences $\Delta n_{eff}$ between the light beams of LP modes that are adjacent to each other are as presented in Table 1.

TABLE 1

| mode | $n_{eff}$ | $\Delta n_{eff}$ |
|---|---|---|
| $LP_{01}$ | 1.45379166 | |
| | | $3.834 \times 10^{-4}$ |
| $LP_{11}$ | 1.45340825 | |
| | | $8.908 \times 10^{-4}$ |
| $LP_{21}$ | 1.45251749 | |
| | | $1.203 \times 10^{-3}$ |
| $LP_{31}$ | 1.45131469 | |
| | | $6.354 \times 10^{-4}$ |
| $LP_{02}$ | 1.45067933 | |
| | | $5.737 \times 10^{-4}$ |
| $LP_{12}$ | 1.45010567 | |
| | | $1.057 \times 10^{-4}$ |
| Clad | 1.45000000 | |

From Table 1, a larger effective refractive index difference of the effective refractive index difference between the light beam of the $LP_{01}$ mode and the light beam of the $LP_{11}$ mode and the effective refractive index difference between the light beam of the $LP_{11}$ mode and the light beam of the $LP_{21}$ mode light beam is $8.908 \times 10^{-4}$. In addition, the effective refractive index difference between the light beam of the $LP_{21}$ mode and the light beam of the $LP_{31}$ mode is $1.203 \times 10^{-3}$. Therefore, a coupling amount of the light beam of the $LP_{21}$ mode and the light beam of the $LP_{31}$ mode is suppressed compared to a coupling amount of the light beam of the $LP_{01}$ mode and the light beam of the $LP_{11}$ mode, and a coupling amount of the light beam of the $LP_{11}$ mode and the light beam of the $LP_{21}$ mode. A larger effective refractive index difference of the effective refractive index difference between the light beam of the $LP_{31}$ mode and the light beam of the $LP_{02}$ mode and the effective refractive index difference between the light beam of the $LP_{02}$ mode and the light beam of $LP_{12}$ mode is $6.354 \times 10^{-4}$ (, which is smaller than the larger effective refractive index difference of the effective refractive index difference between the light beam of the $LP_{01}$ mode and the light beam of the $LP_{11}$ mode and the effective refractive index difference between the light beam of the $LP_{11}$ mode and the light beam of the $LP_{21}$ mode). Therefore, a coupling amount of the light beam of the $LP_{21}$ mode and the light beam of the $LP_{31}$ mode is suppressed compared to a coupling amount of the light beam of the $LP_{31}$ mode and the light beam of the $LP_{02}$ mode, and a coupling amount of the light beam of the $LP_{02}$ mode and the light beam of the $LP_{12}$ mode. In addition, a difference between the effective refractive index of the light beam of the $LP_{12}$ mode and the refractive index of the clad 20 is $1.057 \times 10^{-4}$. Therefore, the light beam of the $LP_{12}$ mode is coupled with the light beam of the clad mode propagating through the clad 20, and thus propagates through the clad 20. Therefore, through this optical fiber, the light beams of three LP modes having the first to third highest effective refractive indexes propagate while being mode coupled with each other, and the light beams of three LP modes having the first to third lowest effective refractive indexes are mode coupled with each other, coupled with the light beam of the clad mode, and then lost.

Next, additional design examples of the optical fiber of the above-described embodiments will be described.

An optical fiber having the refractive index profile of FIG. 1 was designed. In this optical fiber, the radius r1 of the inner core 11 was set to 3.4 µm, the radius of the outer periphery of the outer core 12 was set to 9.5 µm, the refractive index of the inner core 11 was set equal to the refractive index of the clad 20, and the relative refractive index difference A of the outer core 12 to the clad 20 was set to 0.60%. This optical fiber was used as an optical fiber for communication at a wavelength of 1550 nm.

The LP modes of the light beams propagating through the core 10 were $LP_{01}$ mode at this wavelength are $LP_{11}$ mode, $LP_{21}$ mode, $LP_{31}$ mode, and $LP_{02}$ mode. The effective refractive indexes $n_{eff}$ of the light beams of the modes were as presented in Table 2. Accordingly, the effective refractive index differences $\Delta n_{eff}$ between the light beams of LP modes that are adjacent to each other are as presented in Table 2.

TABLE 2

| mode | $n_{eff}$ | $\Delta n_{eff}$ |
|---|---|---|
| $LP_{01}$ | 1.45659030 | |
| | | $7.044 \times 10^{-4}$ |
| $LP_{11}$ | 1.45588591 | |
| | | $1.636 \times 10^{-3}$ |
| $LP_{21}$ | 1.45425014 | |
| | | $2.212 \times 10^{-3}$ |
| $LP_{31}$ | 1.45203784 | |
| | | $1.152 \times 10^{-3}$ |
| $LP_{02}$ | 1.45088601 | |
| | | $8.860 \times 10^{-4}$ |
| Clad | 1.45000000 | |

From Table 2, a larger effective refractive index difference of the effective refractive index difference between the light beam of the $LP_{01}$ mode and the light beam of the $LP_{11}$ mode and the effective refractive index difference between the light beam of the $LP_{11}$ mode and the light beam of the $LP_{21}$ mode light beam is $1.636 \times 10^{-3}$. In addition, the effective refractive index difference between the light beam of the $LP_{21}$ mode and the light beam of the $LP_{31}$ mode is $2.212 \times 10^{-3}$. Therefore, a coupling amount of the light beam of the $LP_{21}$ mode and the light beam of the $LP_{31}$ mode is suppressed compared to a coupling amount of the light beam of the $LP_{01}$ mode and the light beam of the $LP_{11}$ mode, and a coupling amount of the light beam of the $LP_{11}$ mode and the light beam of the $LP_{21}$ mode. The effective refractive index difference between the light beam of the $LP_{31}$ mode and the light beam of the $LP_{02}$ mode is $1.152 \times 10^{-3}$ (, which is smaller than the larger effective refractive index difference of the effective refractive index difference between the light beam of the $LP_{01}$ mode and the light beam of the $LP_{11}$ mode and the effective refractive index difference between the light beam of the $LP_{11}$ mode and the light beam of the $LP_{21}$ mode). Therefore, a coupling amount of the light beam of the $LP_{21}$ mode and the light beam of the $LP_{31}$ mode is suppressed compared to a coupling amount of the light beam of the $LP_{31}$ mode and the light beam of the $LP_{02}$ mode. In addition, a difference between the effective refractive index of the light beam of the $LP_{02}$ mode and the refractive index of the clad 20 is $8.860 \times 10^{-4}$. Therefore, the light beam of the $LP_{02}$ mode is coupled with the light beam of the clad mode propagating through the clad 20, and thus propagates through the clad 20. Therefore, through this optical fiber, the light beams of three LP modes having the first to third highest effective refractive indexes propagates while being mode coupled with each other, and the light beams of two LP modes having the first and second lowest effective refractive indexes are mode coupled with each other, coupled with the light beam of the clad mode, and then lost.

Although the invention has been described above by reference to the above-described embodiments as examples, the invention is not limited thereto.

For example, in the optical fibers 1 to 4 of the above-described embodiments, the number of modes of light beams up to x-th order mode is not particularly limited as long as it is two or more. In addition, the number of modes of light beams of (x+1)-th order mode and higher is not particularly limited as long as it is one or more.

In the above-described embodiments, the side core 40 is a single mode core, but the side core 40 may be a core that allows propagation of light beams of a plurality of modes. In this case, only one of the light beams of the plurality of modes propagating through the side core 40 has to be coupled with a light beams of any one of the (x+1)-th LP order mode and higher propagating through the core 10.

In the above-described embodiments, each core 10 has a refractive index profile of a ring type, but the core 10 may be a core having a refractive index profile of a step type, in which the refractive index is constant along the radial direction, or a core having a refractive index that increases toward the center axis.

In the above-described embodiments, each core 10 is directly surrounded by the clad 20, but a trench layer having a refractive index lower than that of the clad 20 may be formed between the core 10 and the clad 20.

In the above-described embodiments, cases where the number of the cores 10 is seven is described, but in an optical fiber having a plurality of cores 10, the number of the cores 10 is not limited as long as it is two or more.

As described above, according to one or more embodiments of the present invention, an optical fiber capable of allowing appropriate propagation of light beams of a plurality of modes while making them mode coupled can be provided, and can be used in the field of optical communication.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF LETTERS OR NUMERALS 1 to 4 . . . optical fiber
10 . . . core (signal light propagation core)
11 . . . inner core
12 . . . outer core
30 . . . coating layer
40 . . . side core

The invention claimed is:
1. An optical fiber that communicates in a predetermined communication band, the optical fiber comprising:

a signal light propagation core oriented along a central axis of the optical fiber that propagates light beams of up to (x+1)-th order LP mode, where x is an integer of two or more; and a side core that is parallel to the signal light propagating core and that propagates a light beam that is:
  coupled with a light beam of the (x+1)-th order LP mode propagating through the signal light propagation core, and
  suppressed from being coupled with light beams of up to the x-th order LP mode propagating through the signal light propagation core, wherein, mode coupling of the light beams of up to the x-th order LP mode propagating through the signal light propagation core is performed, and mode coupling between the light beam of the x-th order LP mode and the light beam of (x+1)-th order LP mode is suppressed.

2. The optical fiber according to claim 1, wherein the signal light propagation core comprises:
  an inner core having a center axis; and
  an outer core that surrounds an outer circumferential surface of the inner core and has a refractive index higher than that of the inner core.

3. The optical fiber according to claim 1, wherein the side core loses more of a light beam propagating therethrough than the signal light propagation core.

4. The optical fiber according to claim 1, wherein the side core is a clad that surrounds an outer circumferential surface of the signal light propagation core.

5. The optical fiber according to claim 4, wherein relationships (1) and (2) below are satisfied:

$$\Delta n_{eff}a < \Delta n_{eff}c; \text{ and} \qquad (1):$$

$$\Delta n_{eff}b < \Delta n_{eff}c, \text{ where} \qquad (2):$$

$\Delta n_{eff}a$ is a maximum value among effective refractive index differences between light beams of LP modes having effective refractive indexes that are adjacent to each other except for the x-th order LP mode and the (x+1)-th order LP mode, $\Delta n_{eff}b$ is a difference between an effective refractive index of a light beam of the highest order LP mode propagating through the signal light propagation core and a refractive index of the clad, and $\Delta n_{eff}c$ is a difference between an effective refractive index of the light beam of the x-th order LP mode and an effective refractive index of the light beam of (x+1)-th order LP mode.

6. The optical fiber according to claim 5, wherein relationship (3) below is satisfied:

$$\Delta n_{eff}b < \Delta n_{eff}a \qquad (3):$$

7. The optical fiber according to claim 1, wherein relationships (1) to (4) below are satisfied:

$$\Delta n_{eff}a < \Delta n_{eff}c; \qquad (1):$$

$$\Delta n_{eff}a < \Delta n_{eff}d; \qquad (2):$$

$$\Delta n_{eff}b < \Delta n_{eff}c; \text{ and} \qquad (3):$$

$$\Delta n_{eff}b < \Delta n_{eff}d, \text{ where} \qquad (4):$$

$\Delta n_{eff}a$ is a maximum value among effective refractive index differences between light beams of LP modes having effective refractive indexes that are adjacent to each other except for the x-th order LP mode and the (x+1)-th order LP mode, $\Delta n_{eff}b$ is a minimum value among differences between the effective refractive indexes of the light beams of (x+1)-th order LP mode and higher propagating through the signal light propagation core and an effective refractive index of a light beam of at least one mode propagating through the side core, $\Delta n_{eff}c$ is a difference between an effective refractive index of the light beam of the x-th order LP mode and an effective refractive index of the light beam of (x+1)-th order LP mode, and $\Delta n_{eff}d$ is a minimum value among differences between the effective refractive index of the light beam of the x-th order LP mode and the effective refractive indexes of the light beams of the modes propagating through the side core.

8. The optical fiber according to claim 7, wherein relationship (5) below is satisfied:

$$\Delta n_{eff}b < \Delta n_{eff}a \qquad (5):$$

9. The optical fiber according to claim 1, wherein the side core is a single mode core.

10. An optical fiber that communicates in a predetermined communication band, the optical fiber comprising:
  a signal light propagation core oriented along a central axis of the optical fiber that propagates light beams of (x+2)-th order LP mode and higher, where x is an integer of two or more; and
  a side core that is parallel to the signal light propagation core and that propagates a light beam that is:
    coupled with a light beam of any of (x+1)-th order LP mode and higher propagating through the signal light propagation core, and
    suppressed from being coupled with light beams of up to the x-th order LP mode propagating through the signal light propagation core, wherein,
  mode coupling of the light beams of up to the x-th order LP mode propagating through the signal light propagation core is performed,
  mode coupling between the light beam of the x-th order LP mode and the light beam of (x+1)-th order LP mode is suppressed, and
  mode coupling of the light beams of the (x+1)-th order LP mode and higher propagating through the signal light propagation core is performed.

11. An optical fiber that communicates in a predetermined communication band, the optical fiber comprising:
  a signal light propagation core that propagates light beams of up to (x+1)-th order LP mode, where x is an integer of two or more; and
  a side core that is parallel to the signal light propagation core and that propagates a light beam that is:
    coupled with a light beam of the (x+1)-th order LP mode propagating through the signal light propagation core, and
    suppressed from being coupled with light beams of up to the x-th order LP mode propagating through the signal light propagation core, wherein
  mode coupling of the light beams of up to the x-th order LP mode propagating through the signal light propagation core is performed,
  mode coupling between the light beam of the x-th order LP mode and the light beam of (x+1)-th order LP mode is suppressed, and
  the side core is a single mode core.

12. An optical fiber that communicates in a predetermined communication band, the optical fiber comprising:

a signal light propagation core that propagates light beams of (x+2)-th order LP mode and higher, where x is an integer of two or more; and a side core that is parallel to the signal light propagation core and that propagates a light beam that is:
- coupled with a light beam of any of (x+1)-th order LP mode and higher propagating through the signal light propagation core, and
- suppressed from being coupled with light beams of up to the x-th order LP mode propagating through the signal light propagation core, wherein mode coupling of the light beams of up to the x-th order LP mode propagating through the signal light propagation core is performed, mode coupling between the light beam of the x-th order LP mode and the light beam of (x+1)-th order LP mode is suppressed, mode coupling of the light beams of the (x+1)-th order LP mode and higher propagating through the signal light propagation core is performed, and the side core is a single mode core.

* * * * *